Figure 1:
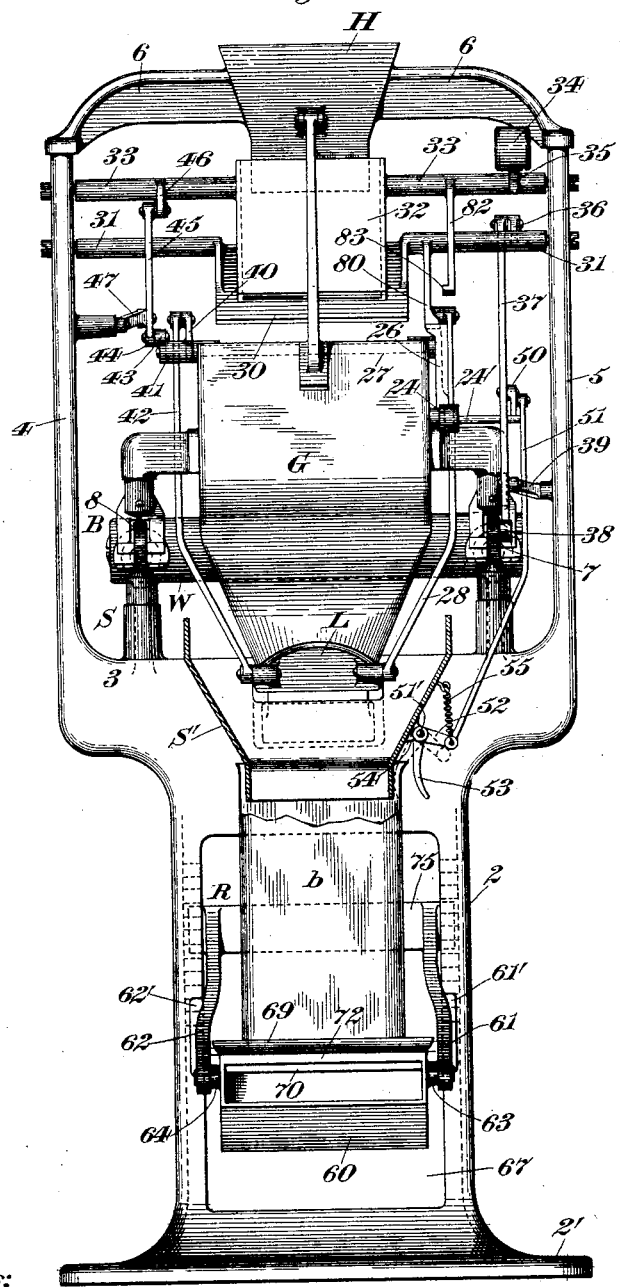

(No Model.)

F. H. RICHARDS.
WEIGHING AND BAGGING MACHINE.

No. 589,287. Patented Aug. 31, 1897.

Witnesses:
C. W. Smith
Fred. J. Dole.

Inventor,
F. H. Richards (No Model.)  4 Sheets—Sheet 2.
F. H. RICHARDS.
WEIGHING AND BAGGING MACHINE.
No. 589,287. Patented Aug. 31, 1897.
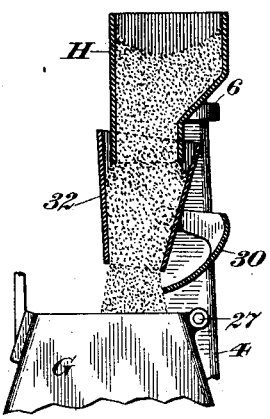
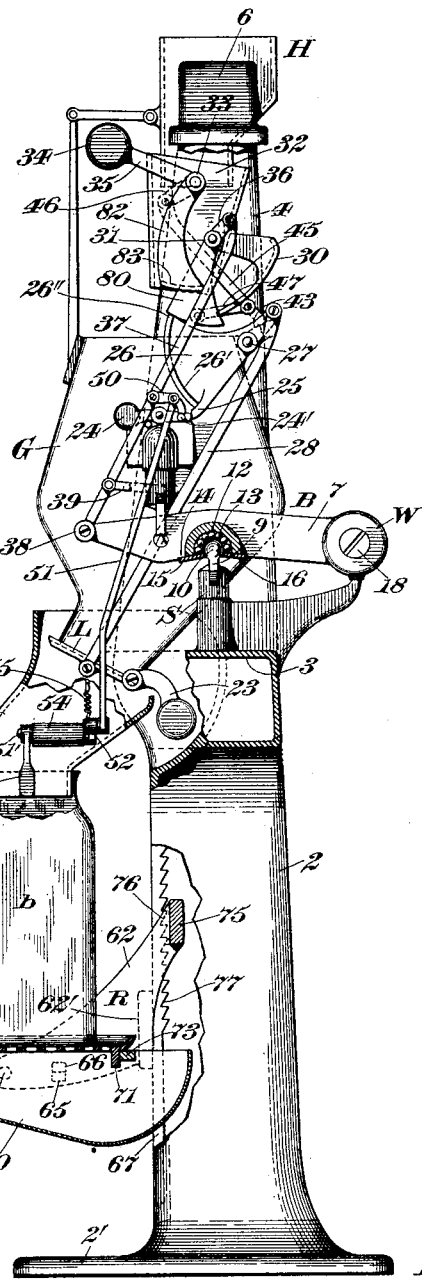
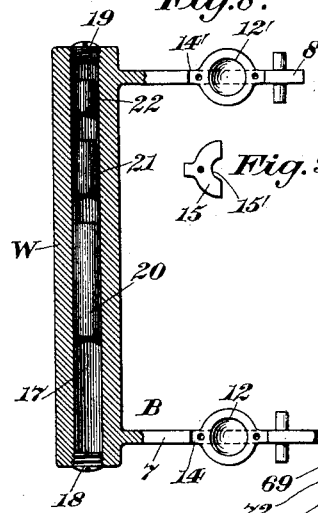
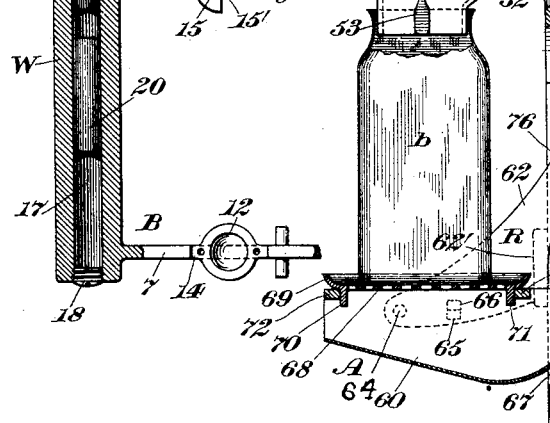
Witnesses;
O. W. Smith
Fred. J. Dole.
Inventor;
F. H. Richards.
THE NORRIS PETERS CO., PHOTO-LITHO., WASHINGTON, D. C.

(No Model.) 4 Sheets—Sheet 3.
F. H. RICHARDS.
WEIGHING AND BAGGING MACHINE.
No. 589,287. Patented Aug. 31, 1897.
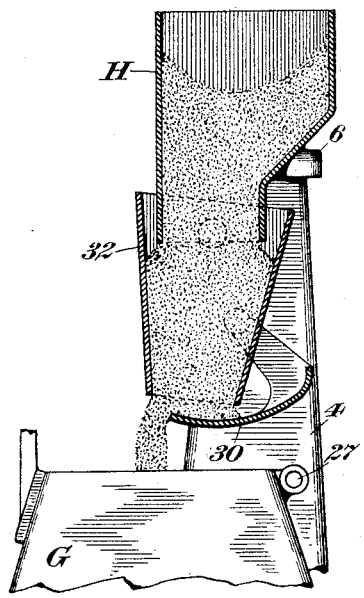
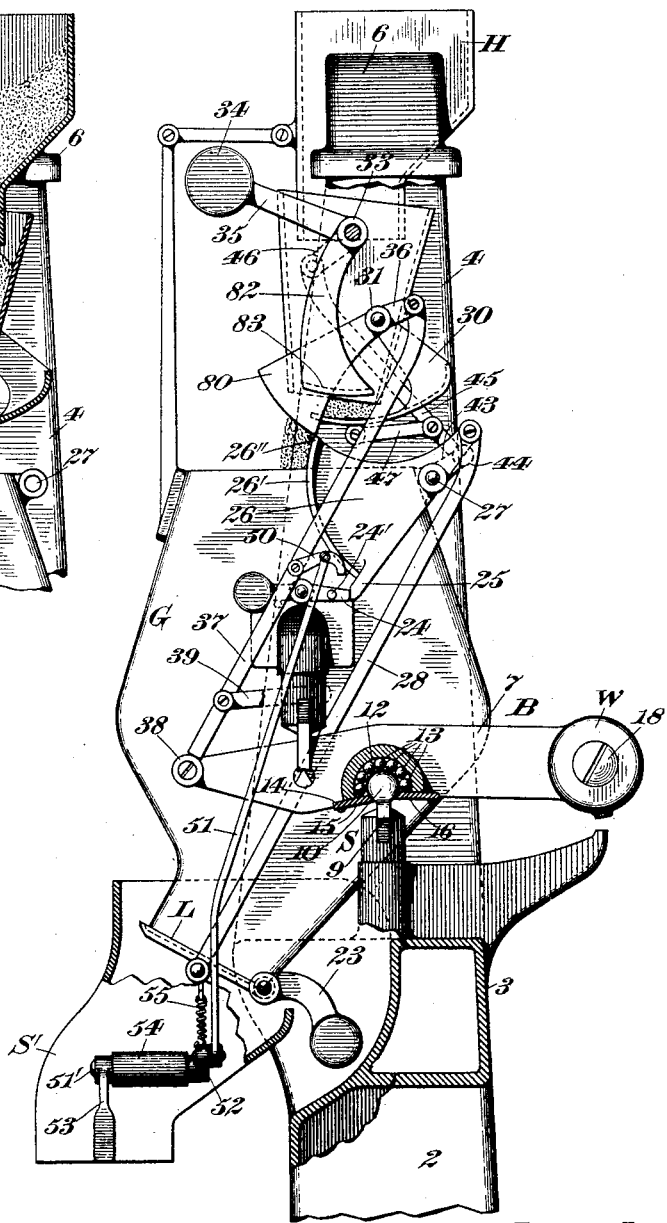
Witnesses:
O. W. Smith
Fred. J. Dole
Inventor,
F. H. Richards (No Model.)  4 Sheets—Sheet 4.

F. H. RICHARDS.
WEIGHING AND BAGGING MACHINE.

No. 589,287.  Patented Aug. 31, 1897.

Witnesses:
O. W. Smith
Fred. J. Dole.

Inventor:
F. H. Richards.

UNITED STATES PATENT OFFICE.

FRANCIS H. RICHARDS, OF HARTFORD, CONNECTICUT.

WEIGHING AND BAGGING MACHINE.

SPECIFICATION forming part of Letters Patent No. 589,287, dated August 31, 1897.

Application filed February 9, 1897. Serial No. 622,599. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing and Bagging Machines, of which the following is a specification.

This invention relates to weighing and bagging machines.

With respect to one of its features the invention comprehends the provision of improved stream-controlling mechanism whereby the supply of material to the load-receiver of the weighing mechanism can be properly regulated or graduated during the weighing of a load and instantly stopped or cut off at the right time.

Another object of the invention is to furnish an improved scale-beam, which in the present case consists of a pair of arms joined by a chambered or longitudinally-bored weight termed the "main" weight, which is of a mass corresponding to that of the empty load-receiver, and in conjunction with said weight one or more auxiliary or load weights will be employed, they being insertible in the chamber or bore of said main weight, whereby loads of different quantities can be readily weighed, and in connection with the scale-beam efficient instrumentalities are provided for sustaining the same, so that it is possible to weigh automatically comparatively small lots of material with an accuracy equal to that of hand-weighing.

Another object of the invention is to provide, in connection with the weighing mechanism, a bag-support which is preferably vertically adjustable to adapt the same to bags or receptacles of different heights or capacities; and said bag-support embodies in its construction a tilting pan or vessel which is adapted to catch material that fails to enter the bag or that may drop from the load-delivering chute beneath the weighing mechanism when the bag is removed, and at desired intervals said pan or vessel may be tilted to effect the removal of the material contained therein.

Figure 7:
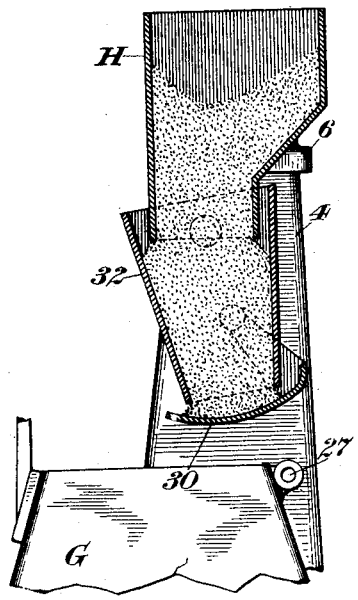
Figure 4:
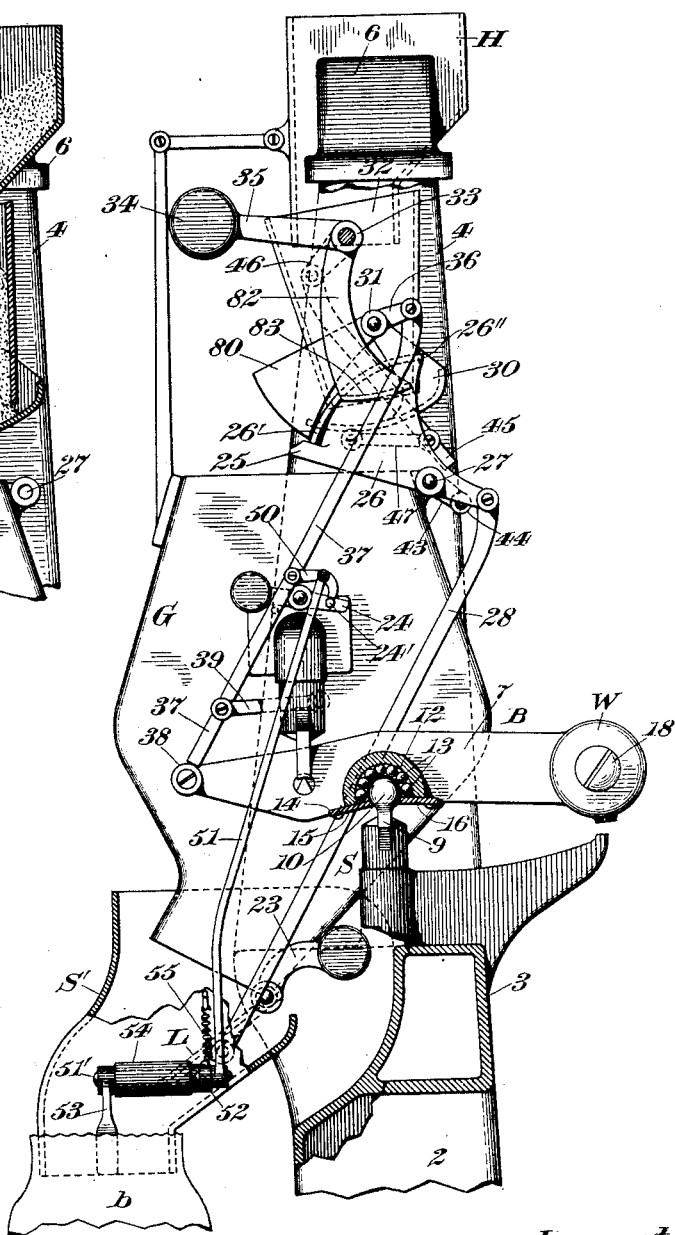

In the drawings accompanying and forming part of this specification, Figure 1 is a front elevation of a weighing and bagging machine embodying my present improvements, and it illustrates the positions occupied by the various parts at the commencement of operation. Fig. 2 is an end elevation of the machine as seen from the right in Fig. 1, the parts being in positions corresponding with said figure and portions of the framing being removed to illustrate more clearly certain features of the invention. Fig. 3 is a similar view, on an enlarged scale, of the weighing mechanism and a spout or conduit for delivering the loads to the bags or other receptacles, the bag-support not being shown. Fig. 4 is a view similar to Fig. 3, showing the closer of the load-receiver open to discharge the load from the latter. Figs. 5, 6, and 7 are longitudinal sections of the supply mechanism, the stream-controllers being in positions corresponding, respectively, with Figs. 2, 3, and 4, and a fragment of the load-receiver being represented in said views. Fig. 8 is an under face view of the scale-beam with the weight thereof in longitudinal central section. Fig. 9 is a detail view of a cap or cover for retaining the antifriction devices of the beam-bearing in position.

Similar characters designate like parts in all the figures of the drawings.

The framing for supporting the different sets of mechanisms in the present case consists of the upright or standard 2, having a widened base 2', by which it may be attached to the floor of a suitable structure, said standard being substantially Y-shaped and having a wide flat portion 3 upon which the weighing mechanism can be mounted.

The two branches 4 and 5 of the standard 2 are joined at the top by the plate 6, which has at its middle the preferably integral chute or hopper H, which constitutes a convenient means for delivering the supply-stream to the load-receiver of the weighing mechanism.

The weighing mechanism, as is usual, is made up of a scale-beam and a suitable load-receiver, the said scale-beam being designated by B and the load-receiver by G.

The scale-beam B is represented in Fig. 8, consisting of a pair of arms 7 and 8, which are joined at the rear by the longitudinally-bored or cylindrical weight W, which is of a mass equal to that of the empty load-receiver G, said parts being conveniently cast in one piece.

The supports for the scale-beam B are two in number, as is customary, one at each side of the weighing mechanism.

In the several end elevations I have represented one of the beam-supports in detail, it, with its companion, being carried in the ordinary manner on the framework of the machine.

The beam-support, which is represented in Figs. 2, 3, and 4, is designated by S, and it consists of a shank or body portion 9, which terminates at its upper end in the ball end or journal 10, the latter being located in the concavity of the beam-arm 7.

A series of antifriction devices or balls is represented at 13, they being disposed between the journal portions 10 of the beam-support and the face of the concavity 12 and serving their well-known purpose.

The arm 7 of the scale-beam B is mortised, as at 14, and I set within the same a pair of caps or guards for retaining the balls in place. Said caps or guards are designated by 15 and 16 and are secured in place in some well-known manner, as by screws. The cap 15, as represented in Fig. 9, consists of a bifurcated plate having a rounded portion 15', which is located adjacent to the ball end or journal 10 of the beam-support.

The arm 8 of the beam B is constructed exactly like its companion, similar parts being designated by the same character with prime-marks.

The weight W, which is horizontally disposed, counterbalances the empty load-receiver G, its bore or chamber being designated by 17, the opposite ends of said bore being preferably closed by the plugs 18 and 19, which in the present case are removable to permit the ready insertion of one or more of the load-weights, as occasion demands, said plugs being screw-threaded in their respective seats and being adapted, when in place, to exclude dust from the interior of the weight.

I have illustrated a series of load-weights, they being designated by 20, 21, and 22, and of different sizes. Said weights are cylindrical, and the diameters thereof are practically the same as the bore of the weight W, so that they may be frictionally held against displacement or lateral movement while the machine is in operation. Let it be assumed that the weights 20, 21, and 22 are equal to a given charge and that it is desired to weigh a less quantity. To obtain this result, the plugs 18 and 19 will be removed and one or all of said weights withdrawn and others substituted in their stead.

The load-receiver G has the usual discharge-outlet, and for covering the same I provide the closer L, said closer consisting of a flat plate pivoted at one side of said outlet and having the counterweighted arm 23 for shutting the same on the discharge of a load.

The load-discharge-controlling means include a latch, such as 24, pivotally supported upon the load-receiver, said latch being positioned to engage the arm 25 of the rocker 26 when the closer is shut. The rocker is carried by the rock-shaft 27, which is mounted on the upper rearward side of the load-receiver and is connected to the closer L by the rod 28. The latch 24 swings upward to engage the rocker-arm 25, it being counterweighted for this purpose, as is customary.

In the present case I provide two stream-controllers, the lowermost consisting of the valve 30, which is of the "oscillatory-pan" type, suspended between the frame members 4 and 5, it being preferably made integral with the two-part shaft 31, which has journal-openings in its opposite ends for receiving pivot-screws carried on said frame members.

There is located intermediate the hopper and the stream-controller or valve a swinging stream-diverter or spout 32, which is supported similarly to the valve 30, its shaft being designated by 33.

In Fig. 2 the spout 32 and valve 30 are represented in their wide-open positions, so that a stream of large volume can flow from the hopper H through the swinging spout and into the load-receiver G, which causes the latter to descend, which is followed by the swinging of the spout 32 rearward to deliver the supply-stream to the rear of the valve and the simultaneous closure of the valve 30, these two parts coacting progressively to reduce and subsequently cut off the supply-stream, as shown in Fig. 4, the successive positions taken by the two stream-controllers 30 and 32 during the descent of the load-receiver being indicated by Figs. 5, 6, and 7.

The valve 30 is a gravity closing-valve, it having a preponderance of weight below its axis of oscillation for effecting this action, and for swinging the spout 32 rearward I provide the weight 34 at the outer end of the rocker-arm 35 on the spout-supporting shaft 33, the action of the valve 30 and the spout 32 being controlled by the weighing mechanism. The valve 30 will be preferably opened by the scale-beam B.

The valve-shaft 31 has a crank-arm 36, to the outer end of which is pivoted the thrust-rod 37, the free end of said thrust-rod bearing against the projection or roll 38 on the arm 7 of the scale-beam B, and said rod is also connected by a guide-link 39 to the framework.

The natural tendency of the valve 30 is to close, but this operation will be prevented by the beam B, with which the rod 37 coöperates. The valve 30 being wide open and the rod 37 bearing against the projection 38 of the scale-beam B, a stream of large volume can enter the load-receiver, as previously stated, to cause the same, and consequently the poising side of the beam B or that part thereof to the left of its fulcrum, to descend, whereby as the beam B falls away from the rod 37 the valve 30 can close. When the closer is shut and the empty bucket rises, the beam is operable, as it ascends, through the medium of the interposed rod 37, for opening the valve 30.

The shaft 27, at the end thereof opposite that furnished with the rocker 26, has affixed thereto the crank-arm 40, the hub of which is designated by 41, said crank-arm having pivoted thereto the rod 42, which is likewise attached to the closer L and in parallelism with the rod 28.

The hub 41 has the crank-arm 43, which is furnished with the stop or roll 44 at its outer end, against which the rod 45, that is operative with the swinging spout 32, is adapted normally to bear. The rod 45 is pivoted to the crank-arm 46 on the two-part-spout shaft 33 and is connected by the guide-link 47 with the framework. The free end of the rod 45 is adapted to bear normally against the roll 44 of the crank-arm 43, as just stated, so that as the load-receiver descends during the loading period the swinging rearward of the spout 32 by the weight 34 can be properly limited by the weighing mechanism. On the initial opening of the closer, as will hereinafter appear, the rods 28 and 42, and hence the crank-arm 43, will be drawn downward, so that the stop or roll 44 will be carried away from the rod 45, whereby the spout 32 can be swung farther inward rapidly by the weight 34.

When the closer shuts, the stop or roll 44 will be carried against the rod 45, so that on the ascent of the weighing mechanism the latter is adapted, through the interposed rod 45, to swing the spout 32 outward, whereby the supply-stream is delivered into the empty load-receiver G.

In connection with the valve 30 and the closer L, I provide a pair of reciprocally-effective interlocking stops, the rocker 26 constituting one of said stops and having the curved flange 26' for a purpose that will hereinafter appear. The stop that is operative with the valve is designated by 80, and it, like the coacting stop 26, is of segmental shape.

The action of the two stops is illustrated in Figs. 2 and 4, the valve 30 being wide open and the closer being shut in the first-mentioned figure, while in the other figure this arrangement is reversed. When the valve 30 is open, as just stated, and until it has nearly cut off the supply-stream, the flange 26' of the stop 26 will be contiguous to the curved face of the coöperating stop 80, as indicated in Fig. 2, so that should the latch 24 be tripped too soon the opening of the closer L will be prevented by the stop 80, which blocks the action of the rocker or stop 26 at the instant the closer opens, and this relation will continue until the valve 30 has almost closed, as represented in Fig. 3, wherein the stop 80 is shown as having intersected the plane of the inside curved face of the rocker or stop 26. On the opening of the closer the rocker 26 will be swung about its axis, and in so doing the stop-flange will be carried substantially in contact with the adjacent stop 80, as represented in Fig. 4, so that the retraction of said stop 80, and consequently of the valve 30, will be obviated.

In connection with the stops 26 and 80 a third interlocking stop will be provided, it being designated by 82 and consisting, preferably, of a segmental plate on the spout-shaft 33, said stop 82 having the curved flange 83, the under face of which is adjacent to the point 26'' of the stop 26, said stop 82 being adapted to block the premature movement of the stop 26 until the load is fully completed, at which time the spout will have been swung to the limit of its rearward movement, as represented in Fig. 2, which action results in the carrying of the stop 82 across the plane of the inside face of the flange 26', so that the stop 26 can then swing about its axis, and in so doing said stop-flange will ride over the coöperating flange 83 of the stop 82 to prevent the retraction of the latter, and consequently of the spout 32, while the load is being discharged. When the closer is shut, the stop 26 will release the coöperating stops 80 and 82, and consequently the valve 30 and the spout 32, so that the last-mentioned parts can be returned to their normal positions by the weighing mechanism, as hereinbefore set forth.

The discharge of the load-receiver will be preferably effected by hand-operated means, as will hereinafter appear, so that an attendant can shake a bag and its contents to any extent and can also remove said bag while the weighing operation proceeds without hindrance.

The bag-support is shown at A, a bag $b$ being represented resting thereon. The mouth of said bag extends around the delivery end of the chute or hopper S', which is conveniently made integral with the standard 2 and the receiving end of which is situated below the discharge-outlet of the load-receiver G.

The tripper for the latch 24 will be preferably hand-operated, such tripper being carried by the reciprocatory thrust-rod 37 and designated by 50, it consisting of a short curved lever pivoted to said rod, its free end being adapted to engage the projecting pin 24' of the latch to depress the same, as represented in Fig. 4, so that said latch will be disengaged from the coöperating arm 25 of the rocker 26.

A relatively long rod is shown at 51 pivoted to the tripping-lever 50 at a point between its support and the free end thereof, said rod being likewise attached to the crank-arm 52, which is carried by the shaft 51', said shaft having at its opposite end the operating crank-arm 53 and being journaled in a bracket 54 on the chute or hopper S'.

It will be seen from the foregoing that the action of the weighing mechanism can proceed without being affected by the placing or removal of a bag beneath the chute S'. By reason of the mounting of the tripper 50 the latch cannot be depressed by the action of the weighing mechanism, as when the rod 37 moves downward with the weighing mechanism the pin 24' will be carried away from the free end of the tripper 50.

When the bag or other receptacle is in proper position to receive a load from the weighing mechanism, the attendant will grasp and force the actuating-handle or crank-arm 53 inward, thereby rocking the shaft 51', and consequently pulling the rod 51 and the tripper 50 downward, which carries the latter into engagement with the projection or pin 24' on the latch 24, whereby the latter will be depressed and disengaged from the arm 25 of the rocker 26. When the latch is thus operated, the closer will be freed of all restraint and can be forced open by the weight of the mass within the bucket, which is delivered into the chute or hopper S', and by the latter conducted or directed into the bag b.

As soon as the latch is tripped the operator will release the crank-arm 53, so that the tripper 50 can be returned to its normal position, and for this purpose I prefer to employ the retracting-spring 55, which is connected, respectively, with the crank-arm 52 and the chute or spout S'.

When the closer is shut, the weighing mechanism will rise, and during this period and until the completion of the next load the contents of the bag b may be shaken to pack the same therein.

The bag-support A embodies the tilting pan or vessel 60, which is pivotally supported between the arms 61 and 62 of the supporting-bracket R, the latter being preferably vertically adjustable to permit the placing beneath the chute S' of bags or receptacles of different sizes. The tilting pan 60 has the projecting trunnions 63 and 64 on its opposite faces, which are journaled in bearings on the two arms of the bracket R, the center of movement of the pan 60 being located a short distance forward of the center of gravity of said pan, so that the latter cannot be tilted forward accidentally, the backward movement of said hopper being prevented by the stop or lug 65 on the bracket-arm 62, upon which rests the lug 66 on the adjacent face of the pan 60, the rear end of said pan being set within the large opening 67 in the standard 2.

A bag-rest is shown at 68, it consisting of a grating having the rim 69 to prevent overflow of the material should it accumulate at a certain point thereon, said bag-rest 68 having flanges 70 and 71, which are set within and against the transverse bars 72 and 73, that extend across the inside of the pan 60 at the upper edge thereof.

As the material accumulates in the bag-rest 68 it may be swept therefrom into the pan or vessel 60, and at intervals the latter can be tilted by the attendant to remove the contents therefrom.

The transverse member 75 of the bracket R is furnished at its opposite ends with suitable teeth, as 76, for engaging the corresponding teeth 77 on the inside face of the standard 2, adjacent to the opening 67 therein. The arms 61 and 62 of said bracket will be provided with the stops or strips 61' and 62', adapted to bear against the face of the standard 2 to hold the bag-support in position. To elevate or lower the latter, the teeth 76 will be simply disengaged from the coöperating teeth on the standard.

The operation of the hereinbefore-described machine, briefly stated, is as follows: Fig. 2 represents the positions occupied by the various parts at the commencement of operation, the closer L being shut and held in such position by the latch 24, which is in engagement with the arm 25 on the rocker 26, and the spout 32 being in its extreme outward position, while the valve 30 is wide open, so that a stream of comparatively large volume can enter the load-receiver. When a certain proportion of the load has been received, the load-receiver and the poising side of the beam B will descend, so that the projection 38 on the beam B moving away from the rod 37 and the projection 44 falling away from the rod 45 will permit the valve 30 to shut by its own weight and the spout 32 to be swung rearward by the weight 34, whereby the volume of the supply-stream is reduced as the load-receiver descends and is subsequently cut off when the load is fully completed. At about this time the bag b can be placed on the support A and an attendant can grasp the operating-handle 53, which results in drawing the rod 51 downward with the tripper 50 into engagement with the pin 24' on the latch 24, so that the latter can be tripped and disengaged from the coöperating arm 25 on the rocker 26, which results in the release of the closer. When the closer is released, it will be forced open by the load within the load-receiver, and the latter will be delivered into the chute or spout S', which conducts it into the bag b, the mouth of which has been previously placed about the discharge end of said chute. When the load is fully discharged, the closer L will be shut by the counterweighted arm 23, and the other parts of the weighing mechanism will be caused to resume their normal positions, and during this time the attendant can shake the bag b and its contents, remove said bag, and place another in position to receive the succeeding charge from the weighing mechanism.

Having described my invention, I claim—

1. The combination, with a load-receiver having a closer, of a supply-hopper; a valve; a swinging stream-diverter situated between the valve and the hopper; means for simultaneously closing the valve and swinging the stream-diverter rearward; and means connected with the closer for oppositely swinging said stream-diverter.

2. The combination, with a load-receiver having a closer, of a hopper; a valve; a swinging stream-diverter situated between the valve and the hopper; means for simultaneously operating the valve and the stream-diverter; a shaft mounted on the load-receiver and connected with the closer; a stop connected with said shaft; and a member coöperative with, and movable relatively to, the stream-diverter, said member being adapted normally to bear against said stop.

3. The combination, with a load-receiver having a closer, of a hopper; a valve; a movable stream-diverter situated between the valve and the hopper; a shaft connected with the closer and having a crank-arm provided with a stop; a rod connected with, and movable relatively to, the stream-diverter, the free end of said rod being adapted normally to bear against said stop; and means for simultaneously closing the valve and swinging the stream-diverter rearward.

4. The combination, with a load-receiver having a closer, of a hopper; a valve; a swinging stream-diverter; a shaft connected with said closer and having a crank-arm provided with a stop; a rod, the free end of which is normally adapted to bear against said stop and which is coöperative with the stream-diverter; an interlocking stop carried by said shaft and operative with the closer; and a coöperating interlocking stop connected with the stream-diverter.

5. The combination, with a load-receiver having a closer, of a hopper; a valve; a swinging stream-diverter; a shaft having a crank-arm provided with a stop; a rod connected with said stream-diverter and with the framework by a guide, the free end of said rod being adapted to bear normally against said stop; an interlocking stop operative with the closer and carried by said shaft; a coöperating interlocking stop connected with the stream-diverter; and a third interlocking stop operative with the valve and adapted to coact with the closer interlocking stop.

6. The combination, with weighing mechanism including a load-receiver the discharge of which is controlled by means comprehending a latch, of stream-controlling means; a rod situated between the stream-controlling means and the weighing mechanism; a tripping-lever connected to said rod; a second rod pivoted to said tripping-lever at a point between its connection with said first-mentioned rod and its free end; and hand-operated means for drawing said rod downward.

7. In a weighing and bagging machine, the combination, with weighing mechanism including a load-receiver, of means for effecting the discharge of said load-receiver; and a bag-support located below the weighing mechanism and adapted to sustain a bag in position to receive material from the load-receiver, said bag-support embodying a tilting pan.

8. In a weighing and bagging machine, the combination, with weighing mechanism including a load-receiver, of means for effecting the discharge of said load-receiver; and an adjustable bag-support situated below the weighing mechanism and adapted to sustain a bag to receive material from the load-receiver, said bag-support embodying a tilting pan.

9. In a weighing and bagging machine, the combination, with weighing mechanism including a load-receiver, of means for effecting the discharge of said load-receiver; and a vertically-adjustable bag-support below the weighing mechanism and adapted to sustain a bag in position to receive material from the load-receiver, said bag-support embodying a tilting pan.

10. In a weighing and bagging machine, the combination, with weighing mechanism including a load-receiver, of means for effecting the discharge of said load-receiver; a bracket on the framework, having two arms; and a tilting pan located below the weighing mechanism and adapted to sustain a bag in position to receive material from the load-receiver, said pan being pivotally suspended between said arms and having its axis of movement at one side of its center of gravity.

11. In a weighing and bagging machine, the combination, with weighing mechanism including a load-receiver, of means for effecting the discharge of said load-receiver; a bag-support adapted to sustain a bag in position to receive material from the load-receiver and including a pivotally-supported pan the axis of movement of which is forward of its center of gravity, whereby a forward movement of the pan is prevented; and means for preventing the opposite action of said pan.

12. In a weighing and bagging machine, the combination, with weighing mechanism including a load-receiver, of means for effecting the discharge of the load-receiver; a bracket adjustably carried by the framework and having a pair of arms; a pan pivotally supported between said arms, the pivotal point of said pan being located forward of its center of gravity; a lug on one of the bracket-arms; a coacting lug on the pan, adapted to rest on said first-mentioned lug; and a grated bag-rest carried on said pan and adapted to sustain a bag in position to receive material from the load-receiver.

FRANCIS H. RICHARDS.

Witnesses:
 FRED. J. DOLE,
 F. N. CHASE.